Oct. 27, 1959  J. T. CABBAGE  2,910,427
COKING OF HYDROCARBON OILS
Filed July 7, 1954  6 Sheets-Sheet 2

INVENTOR.
J. T. Cabbage
BY
Hudson & Young
ATTORNEYS

Oct. 27, 1959

J. T. CABBAGE

2,910,427

COKING OF HYDROCARBON OILS

Filed July 7, 1954

INVENTOR.
*J. T. Cabbage*

BY

ATTORNEYS

Fig. 6.

2,910,427
Patented Oct. 27, 1959

2,910,427

COKING OF HYDROCARBON OILS

John T. Cabbage, Bartlesville, Okla., assignor to Phillips Petroleum Company, a corporation of Delaware Application July 7, 1954, Serial No. 441,771

21 Claims. (Cl. 208—126)

This invention relates to the conversion of hydrocarbon oils. In one aspect this invention relates to a method for coking an oil wherein said oil, present as a layer of oil on particles of a bed of particulate material, is partially coked in one portion of the bed and coking is completed in another portion of the bed at an elevated temperature after dilution of said bed with additional hot particulate material free of partially coked oil. In another aspect the invention relates to employing a downwardly moving bed of granular particulate material in said coking method. In another aspect the invention relates to employing a dense fluidized bed of finely divided solids in said coking method. In still another aspect this invention relates to a method for coking a hydrocarbon oil wherein a portion of the vapors produced can be recovered before substantial cracking occurs. In still another aspect the invention relates to a new technique for employing a fluidized bed of contact solids in carrying out a reaction. Other aspects will be apparent from that which follows.

In recent years various processes have been developed for coking residual oils and other types of heavy hydrocarbon oils. These processes have included both moving bed processes and fluidized bed processes wherein coke formation is caused to occur on the particles of contact material in the bed. However, one serious difficulty which has beset practically all of the prior art processes is agglomeration of the particles carrying the partially coked oil, i.e., the particles are no longer free-flowing but are agglomerated into clumps. Such agglomeration not only causes operating difficulties but also prevents production of a uniform quality product where the coke is recovered as a product of the process.

I have found that agglomeration can be prevented and a high quality coke produced by causing a layer or coat of oil to be formed on the particles of a contact bed. The coated particles are then maintained at a substantially constant temperature until the oil is partially coked. Then, before coking has proceeded to the point where agglomeration sets in, an increase in temperature and a dilution of the contact bed are caused by introducing additional clean hot particulate contact material into said bed. Increasing the temperature completes said coking and the additional clean particulate material prevents agglomeration.

Thus, according to this invention there is provided a method for coking an oil which comprises: maintaining a bed of hot fluent particulate material in a coking zone under coking conditions; introducing an oil to be coked into said coking zone in a manner and amount so as to form on the particles of said particulate material a layer of said oil; at least partially coking said layer of oil, during which coking coated particles are caused to settle into a lower portion of said zone; supplying additional heat and particulate material to the lower portion of said zone in an amount sufficient to prevent agglomeration of said oil covered particles as coking proceeds; completing said coking; withdrawing vapors from an upper portion of said zone; and withdrawing free-flowing particulate material covered with a layer of coke from said zone.

In one embodiment the method of the invention comprises introducing a stream of granular particulate material as a freely-falling stream into the upper portion of a coking vessel to establish and maintain a downwardly moving bed of particulate material, under coking conditions, in said vessel. The oil to be coked is introduced into the coking vessel in a manner and amount to form on the granular particulate material a layer of oil, a portion of which vaporizes before substantial cracking occurs, causing an unvaporized portion to adhere to the particulate material as a layer of reduced oil. The term "reduced oil" as used herein and in the claims refers to an oil which has been reduced in volume, i.e., it is a residue which remains after a portion of the original oil is removed as by vaporization. Said layer of reduced oil is gradually and progressively coked as the bed of particulate material moves downwardly through the vessel at a controlled rate. The rate of coking in the downwardly moving bed can be controlled by the rate of movement of the bed and controlling the temperature in the bed by the introduction of additional particulate material at a predetermined temperature. An additional and important feature of the invention is that the said additionally introduced particulate material serve to "dilute," i.e., the additional particles go between or spread apart, the particulate material already in the bed and coated with partially coked reduced oil, preventing agglomeration of the coated particles as coking proceeds and thereby making possible the recovery of free-flowing particles covered with a layer of dry calcined coke.

Counter-current contacting of the vapors with the introduced feed oil pre-heats the feed, quenches the vapors, removes entrained heavy oils, tars, etc., from said vapors and prevents coking of the vapor outlet. It is a feature of the invention that, if desired depending upon the charge stock, the vapors initially flashed upon introduction of the oil into the coking vessel can be recovered separately from the vapors produced later in the course of the coking reaction. The initially flashed vapors are produced and can be recovered before substantial cracking occurs and are of good quality for charging stock for subsequent conversion such as catalytic cracking. The amount of vapors initially flashed from a given oil can be controlled by the temperature of the introduced feed and the temperature of the incoming particulate material. Obviously the amount of vapors initially flashed will depend upon the boiling range of the oil to be coked. In those instances where the oil has a boiling range too high to permit vaporization before substantial cracking occurs, it is preferable to avoid excessive initial cracking and vaporization because a high initial rate of cracking tends to produce a non-adhering coke of inferior quality. A high initial rate of cracking can be avoided by maintaining that portion of the bed which the oil initially contacts at a relatively low temperature compared to the temperature in the portion of the bed where coking is completed. The type of oil being coked will also be controlling since some oils crack more readily than others. When the initially flashed vapors are recovered separately the later produced vapors, according to this embodiment of the invention, are collected and removed by means of a collector tray in the bed, described in detail below.

In another embodiment the method of the invention comprises: maintaining in a coking vessel, under coking conditions, a dense fluidized bed of finely divided solids, said bed having an upper central portion separated from a surrounding annular portion at an upper part of the bed and merged with said annular portion at a lower part of the bed; said bed is maintained by introducing into one of said central and said annular portions a first fluidized stream of finely divided solids and introducing a second fluidized stream of finely divided solids into the lower part of said bed. The oil to be coked is introduced into that portion of the bed into which said first fluidized stream of finely divided solids is introduced. Said oil is introduced in a manner and amount to form on the finely divided solids a layer of oil, a portion of which vaporizes before substantial cracking occurs, causing an unvaporized portion to adhere to said solids as a layer of reduced oil, which is then partially coked. During said coking a portion of the coated solids are caused to settle into the lower part of the bed. There they are contacted and admixed with said second stream of fluidized finely divided solids introduced at a temperature and in an amount to prevent agglomeration of the coated solids by dilution as previously explained in connection with the first described embodiment. The greater part of said admixture is transported into that portion of the bed (central or annular) other than the portion into which said first stream of fluidized finely divided solids is introduced, said coking is completed, and freeflowing finely divided solids coated with a layer of dry calcined coke are withdrawn from said vessel.

Similarly as in the previously described embodiment, counter-current contacting of the vapors with the introduced feed oil pre-heats the feed, quenches the vapors, removes entrained heavy oils, tars, etc., from said vapors and prevents coking of the vapor outlet. As explained in detail below, in connection with the description of the drawings, the vapors produced in each of the said central and annular portions of the bed can be recovered separately if desired.

From the above it is to be noted that the method of the invention comprises at least three related steps carried out in a single coking vessel under carefully controlled conditions.

First, forming a layer of the oil to be coked on the hot particles of particulate material.

Second, the particles carrying a layer of oil are maintained in one portion of the bed under carefully controlled temperature conditions for a period of time sufficient to slowly and progressively partially coke the oil.

Third, before the coking has proceeded to the point where the particles carrying the partially coked oil will start to agglomerate, said particles are transferred to another portion of said bed, wherein a simultaneous increase in temperature and a dilution of said particles is caused by the introduction of additional hot particles free of partially coked oil, and said coking is completed.

Steps two and three above are the actual coking steps. In the prior art these two steps are usually carried out as one step. By carrying out the actual coking of the oil, according to my invention, in at least two stages (1) a partial coking stage under carefully controlled temperature conditions and which is terminated before agglomeration sets in and (2) a final coking at a higher temperature after dilution of the coated particles, the difficulties of the prior art can be avoided.

Further according to this invention there is provided an apparatus for coking an oil which comprises: a coking vessel having means for maintaining a bed of particulate material in said vessel, said means including a first distributor means for introducing particulate material into said vessel to form and maintain said bed and at least one other distributor means for introducing additional heat and particulate material into a lower portion of said bed in an amount sufficient to prevent agglomeration of said particulate material as coking proceeds and is completed; means for forming a layer of the oil to be coked on said particulate material; and means for withdrawing reaction products from said vessel.

In one embodiment the apparatus of the invention comprises a coking vessel adapted to maintain a downwardly moving bed of granular particulate material in said vessel and where the above mentioned distributor means comprise a plurality of inlet conduits extending into said vessel to introduce particulate material into said vessel.

In another embodiment the apparatus of the invention comprises a coking vessel adapted to maintain a dense fluidized bed of finely divided solids in said vessel and where the above mentioned distributor means comprise a plurality of distributor grid plates positioned within said vessel and connected to conduits for introducing finely divided solids into said vessel.

These embodiments and modifications thereof will be described in detail below in connection with a description of the drawings.

Figure 3–A is a diagrammatic drawing, partly in section, of a modified form of the coking vessel of Figure 3.

Figure 3–B is a cross-section along the line B—B of Figure 3–A.

Figure 1:
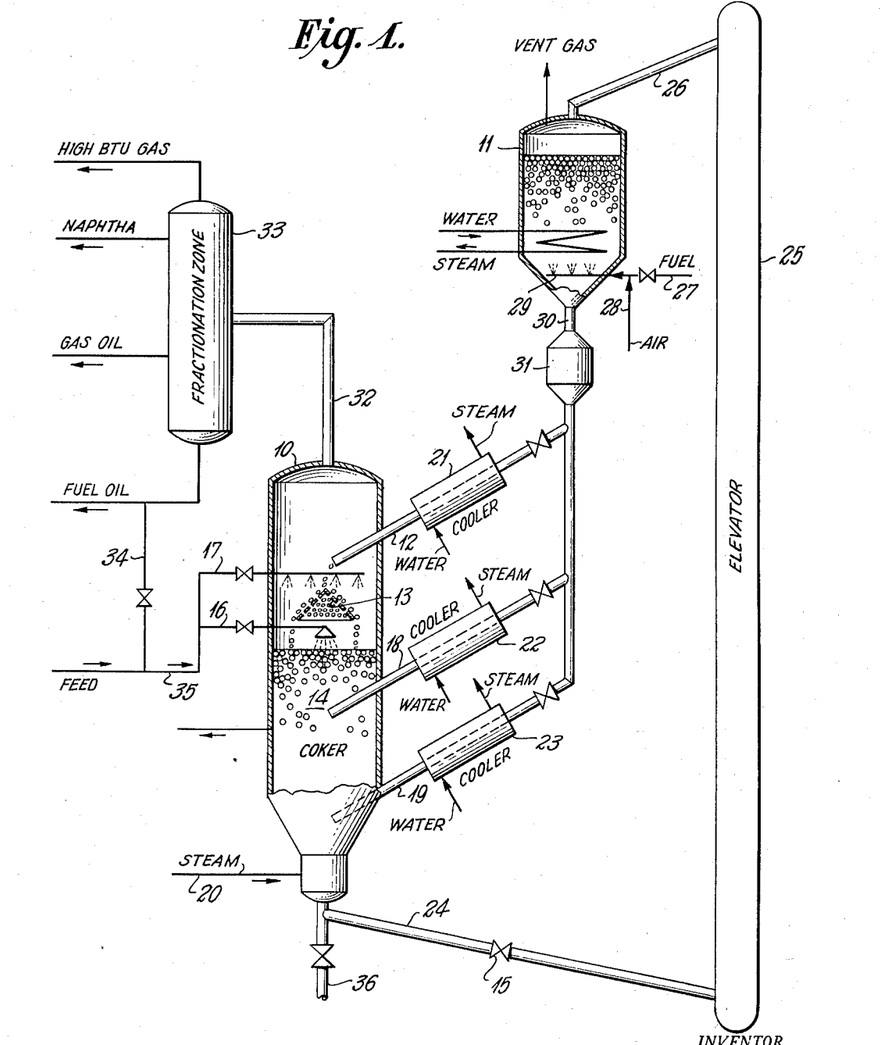
Figure 1 is a diagrammatic drawing, partly in section, illustrating the embodiment of the invention wherein a downwardly moving bed of granular particulate material is employed.

In Figure 1 hot granular solids are introduced into coker 10 from reheater 11 through conduit 12. Said solids fall onto distributor plate 13 which comprises a perforated inverted cone-shaped plate and fall therefrom as a freely falling stream to the surface of bed 14. Bed 14 is maintained in coker 10 by means of valve 15. The hydrocarbon oil to be coked is heated in a preheater (not shown) to a desired minimum temperature and is introduced through lines 16 and/or 17 into coker 10 by means of a suitable spray arrangement as shown. The sprayed oil contacts the falling solids particles and forms a thin film of oil thereon. A portion of the oil also contacts a top layer of solids particles in bed 14. Said particles having a thin film of oil adhering thereto move slowly downward through bed 14, the flow rate of which is controlled by valve 15, and which is maintained at a rate sufficient to keep the particles in the coker zone at an optimum time for the slow vaporization and coking of the oil on said particles. Additional heat can be introduced into bed 14 by introducing an additional stream of hot particles through conduit 18 and/or conduit 19. The hot particles introduced through conduit 18 serve to maintain the bed at a substantially constant temperature or at a gradually increasing temperature as desired. The hot particles introduced through conduit 19 serve two purposes (1) they furnish additional heat to complete the coking of the oil on said particles and calcine said coke and (2) they serve to dilute the coated particles already present in said bed thereby preventing agglomeration as said coking is completed. The calcining of the coke made possible by the additional heat supplied by particles introduced through conduit 19, and preferably carried out in the presence of steam introduced through line 20, makes possible the production of a hard, dense, high grade petroleum coke. The temperature of the hot particles introduced into coker 10 through conduits 12, 18 and 19 can be controlled by means of coolers 21, 22 and 23 as will be understood by those skilled in the art. Free-flowing coke covered particles are withdrawn from the bottom of coker 10 through conduit 24 and passed into elevator 25 which conveys them into conduit 26 from where they enter reheater 11. Fuel and air are admitted to burners 29 through lines 27 and 28, respectively, and are used to initiate burning of coke from the coke covered particles in reheater 11. Once burning of said coke has been initiated, and the reheater is at the desired temperature, the fuel is cut out of line 27 and combustion is controlled by regulating the air introduced through line 28. Coke-free particles are withdrawn from reheater 11 through conduit 30 into surge pot 31 from which they flow into coker 10 by means of conduits 12, 18 and 19, as previously described. Vapors are withdrawn from coker 10 through conduit 32 and passed into fractionation zone 33 from which desired fractions such as a high B.t.u. content gas, naphtha, gas oil, and a fuel oil are recovered as shown. If desired, said fuel oil can be recycled through conduit 34 into conduit 35 and then introduced with the feed into coker 10. Recycle of said fuel oil, as described, provides a means for the ultimate recycle to extinction of the fuel oil fraction, i.e., conversion of the hydrocarbon oil feed into coke and distillates and gas.

When a granular coke is employed as the heat carrying particles of the system, if desired, a stream of said coke particles can be withdrawn through conduit 36 as product coke of the system. Such coke is a hard, dense petroleum coke of high quality and finds ready use, for example, in the manufacture of electrodes for the aluminum industry. Also, when granular coke is employed as the heat carrying particles, the combustion of said coke in reheater zone 11 is controlled so as to burn only a portion of said coke and reheat the remainder for reuse in the system. When refractory particles such as ceramic pebbles, etc., are employed as the heat carrying particles of the system, a stream can be withdrawn through conduit 36 and shock-chilled to remove a layer of coke therefrom as a coke product of the process. The clean pebbles are then reintroduced into elevator 25 and passed through reheater zone 11, as previously described.

Spraying the feed into the top of the coking vessel, above the coking bed, has several advantages. In addition to distributing the feed evenly on the heat carrying particles, the vapors rising from the coker bed are contacted countercurrently with the sprayed feed, thus quenching said vapors and returning any entrained material which is not vaporized at a given temperature to the coker bed for further coking. The feed oil is also preheated by this countercurrent contact. Quenching in this manner prevents deposition of coke in withdrawal conduit 32. Quenching in this manner also permits control of the upper limit of the boiling range of the overhead yield. By proper regulation of the preheat temperature of the introduced oil and the temperature of the heat carrying particles introduced through conduit 12, the end point of the overhead vapors can be closely controlled. In this manner material which has been sufficiently reduced in boiling range is permitted to leave the coking zone without further detrimental cracking, but the high boiling material is returned to the coking zone for further coking.

Figure 2:
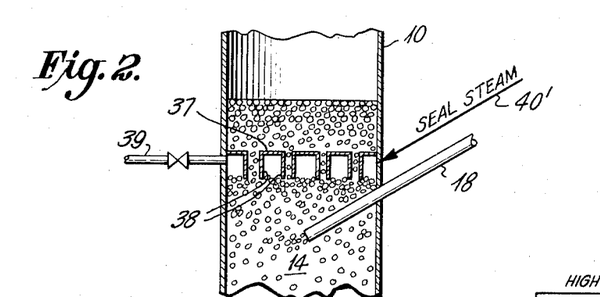
Figure 2 is a diagrammatic illustration, partly in section of a vapor collector tray which can be employed in the coking vessel of Figure 1.

When the collector tray 37 of Figure 2 is employed in coker 10 of Figure 1 the particulate material flows downward through downcomers 38 and rising vapors are collected in the spaces 40 beneath tray 37. Sealing steam can be injected from line 40' into downcomers 38 to prevent vapors from passing tray 37. Collected vapors are withdrawn through conduit 39 for further processing thus making possible the segregation of these more cracked vapors from the less cracked vapors produced in the upper part of bed 14. If desired more than one collector tray 37 can be employed at other positions in bed 14.

Figure 3:
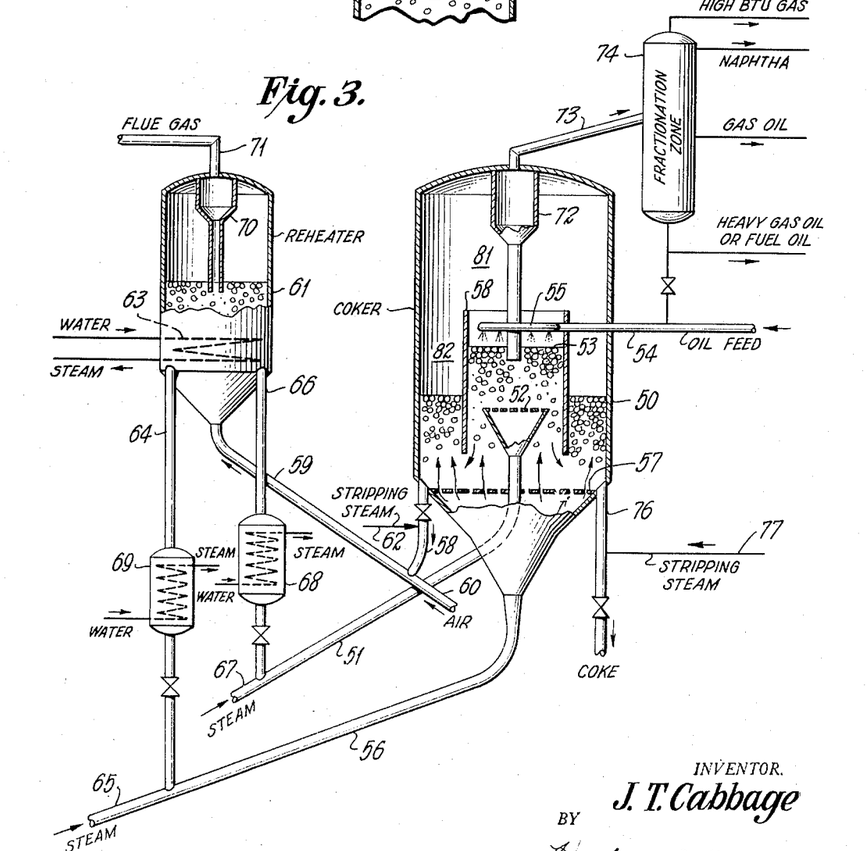
Figure 3 is a diagrammatic drawing, partly in section, illustrating the embodiment of the invention wherein a dense fluidized bed of finely divided particulate material is employed.

Figure 3 illustrates an embodiment of the invention wherein a dense fluidized bed of finely divided particulate material is employed as the coking bed. Coker vessel 50 is a vertical substantially cylindrical vessel having a cylindrical partition 58 mounted intermediately between the ends of said vessel. Said cylindrical partition forms a cylindrical central section 81 open at both ends and surrounded by an annular section 82 within said vessel. A first distributor grid 52 is positioned within the lower portion of said central section. A second distributor grid 57 is positioned in the lower portion of said vessel below said central section and below said first distributor grid. It is to be noted that the two said sections are merged at their lower part. Hot finely divided solids fluidized and carried in a stream of steam are introduced into coker zone 50 by means of conduit 51 and distributor grid 52 to establish a dense fluidized bed the top of which is represented by line 53. Hydrocarbon oil to be coked is introduced via conduit 54 into said central section of coker zone 50 by means of spray arrangement 55 and is sprayed downwardly onto the top of said dense fluidized bed of finely divided solids to form a layer of oil on said solids. Finely divided solids carrying said layer of oil are maintained in the central portion of the dense fluidized bed sufficiently long to at least partially coke the oil on the surface thereof. The finely divided solids around the periphery of the central portion of the turbulent fluidized bed are influenced less by the fluidizing medium introduced through grid 52. They, therefore, tend to settle and pass downwardly and around distributor grid 52 to the lower portion of the fluidized bed, i.e., that portion of the bed below grid 52 where they are contacted and diluted by an additional stream of hot clean finely divided solids introduced by means of conduit 56 and distributor grid 57 and are conveyed into annular section 82. Also as the particles become heavier the tendency to settle as described is increased. A portion of the finely divided solids from grid 57 enter the central portion of the dense fluidized bed and in turn become coated with oil and coke as described. As said particles become heavier, they, too, pass downwardly around distributor grid 52 and are conveyed into the annular portion of the dense fluidized bed between cylindrical baffle 58 and the walls of the coker vessel 50, i.e., annular section 82. The amount of the finely divided solids introduced through grid 57 which enters the central portion of the fluidized bed can be controlled by the relative heights of the distributor grids, the velocity of the fluidizing medium passing through each of said grids and the size of the annular opening between distributor grid 52 and cylindrical baffle 58 as will be understood by those skilled in the art in view of this disclosure. It is presently preferred to maintain the top of the central portion of the fluidized bed substantially higher than the top of the annular portion of the fluidized bed because the difference in the heights of the said portions of the bed aids in transfer of the partially coked particles from said central portion to said annular portion of the bed. In those instances where the oil is introduced onto the top of the annular portion of the fluidized bed (Figures 5 and 6, discussed hereinafter) the top of the annular portion of the bed is preferably maintained higher than the top of the central portion. The additional stream of clean hot finely divided particles introduced through grid 57 serves to supply additional heat to the bottom of the dense fluidized bed to complete said coking and to calcine the coke formed on the surface of the finely divided particles. The clean finely divided solids also dilute the coated solids already in said bed thereby preventing agglomeration during completion of said coking.

A portion of said coke covered finely divided solids are withdrawn through standpipe 58 and conveyed by means of conduit 59 with air introduced into said conduit by line 60, into reheater vessel 61 where the coke is burned from the surface of said finely divided solids. If desired, stripping steam can be introduced into conduit 58 by means of line 62. The temperature of the dense fluidized bed in reheater 61 is controlled by means of heat exchanger 63, which also serves as a steam generator. Coke-free hot finely divided solids are withdrawn from reheater 61 through standpipe 64 and introduced into conduit 56 wherein they are fluidized by means of steam introduced through line 65, to form said second stream or said additional stream of finely divided solids introduced into coker vessel 50. Coke-free hot finely divided solids are also withdrawn from regenerator 61 by means of standpipe 66 and introduced into conduit 51 wherein they are fluidized by means of steam introduced through line 67 to form the dense fluidized mixture introduced into said coking zone 50 through distributor grid 52. As described in connection with Figure 1, the temperature of the two streams of hot finely divided solids withdrawn from regenerator 61 can be controlled by means of coolers 68 and 69, and thereby maintain, if desired, a differential in the temperatures of the streams of hot finely divided solids introduced into coking zone 50. Combustion gases are withdrawn from regenerator 61 through separation means 70 and conduit 71. Vapors from coker zone 50 are withdrawn by means of separation means 72 and conduit 73 into fractionation zone 74 from which product streams comprising a stream of high B.t.u. gas, a stream of naphtha, a stream of gas oil and a stream of heavy gas oil or fuel oil are recovered as shown. If desired, said heavy gas oil or fuel oil stream can be recycled by means of line 75 into line 54 and thereby return to coker zone 50 for coking. This recycle of the heavy gas oil or fuel oil fraction provides a means of converting the original hydrocarbon oil feed into coke and distillate products only, i.e., the fuel is recycled to extinction. When finely divided coke is employed as the finely divided heat carrying solid medium of the process, a stream of said finely divided coke may be withdrawn from coker zone 50 through conduit 76 as a coke product of the process. Said coke product is a hard, dense petroleum coke which finds a ready market such as for the manufacture of electrodes for the aluminum industry. If desired, a stream of stripping stream may be introduced into conduit 56 by means of line 77. When inert solids other than coke are employed, the regeneration process is as previously described. However, when finely divided coke is employed in the system, the burning in regenerator 61 is controlled so as to not completely burn the coke particles but only to burn the excess coke, i.e., the coke laid down on the particles in coker zone 50. The nucleus or the original coke particles are then recycled in the system as described. Alternatively, if desired, only a portion of said excess coke sufficient to supply the heat necessary for the process is burned, the remainder being withdrawn as a product of the process.

It will be noted that in this embodiment of the invention the oil feed is sprayed into the coker zone similarly as in the embodiment shown in Figure 1 with the same advantages of countercurrent contact and control of the end boiling point of the overhead vapors. Thus the same advantages for the quenching system are realized in this embodiment of the invention as for the embodiment illustrated in Figure 1.

Figures 3A, 3B:
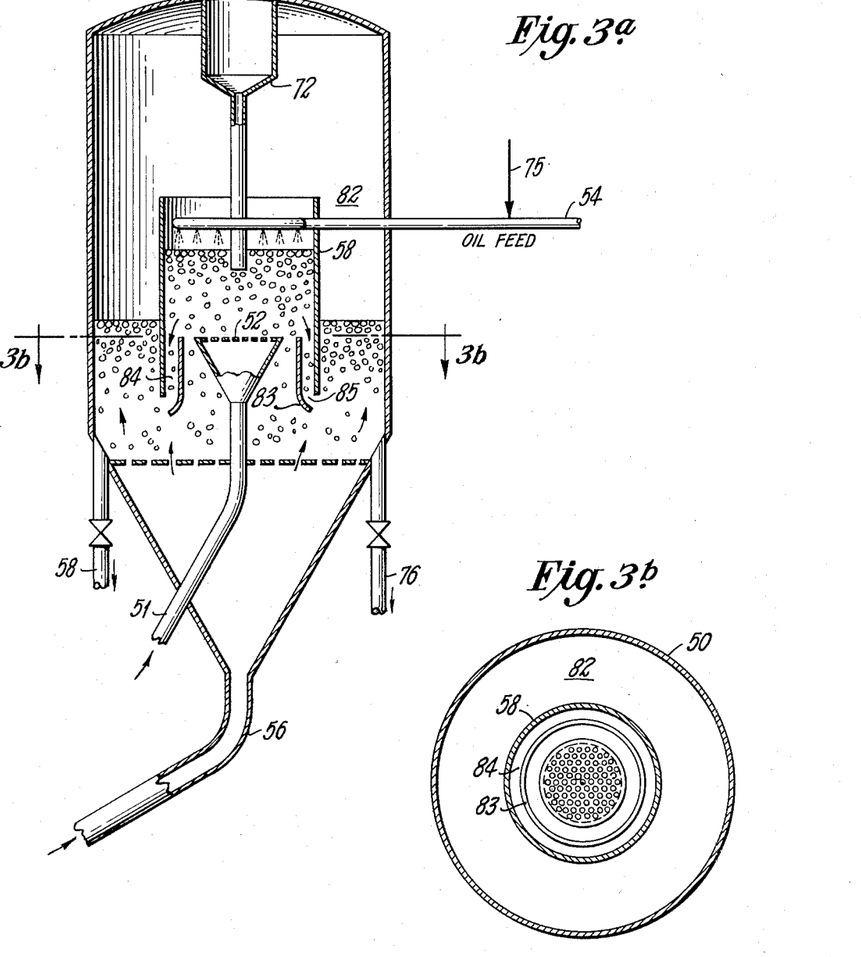

Figures 3–A and 3–B illustrate a modification of the coker vessel 50 of Figure 3; Figure 3–B being a cross-section along the line B—B of Figure 3–A. In this modification a baffle 83, cylindrical in form throughout the greater portion of its length, is mounted inside cylindrical partition 58 so as to form an annulus 84 between said partition 58 and said baffle 83. As shown in Figure 3–A baffle 83 extends downwardly from a point approximately equal in elevation to distributor grid 52. However, if desired the top of baffle 83 can be either above or below the level of distributor grid 52. Baffle 83 extends beyond the bottom of partition 58 and is curved outwardly or laterally at its lower extremity in a direction toward the wall of vessel 50. In a preferred form the curved laterally extending portion of baffle 83 terminates in the downwardly projected plane of partition 58. The opening 85 thus formed between the lower end of baffle 83 and the lower end of partition 58 is approximately equal in cross-sectional area to the cross-sectional area of the annulus 84. Baffle 83 thus provides an annulus 84, protected at its lower extremity from the stream of fluidized particles introduced through distributor grid 57. In operation a portion of the finely divided fluidized particles around the periphery of the central portion of the fluidized bed settle downwardly through annulus 84 into the lower portion of the fluidized bed where they are contacted with the stream of finely divided solids introduced through grid 57 and are conveyed into the annular portion of the fluidized bed in annular section 82. The remainder of the operation is similar to that described for the coker vessel 50 of Figure 3.

Figure 4:
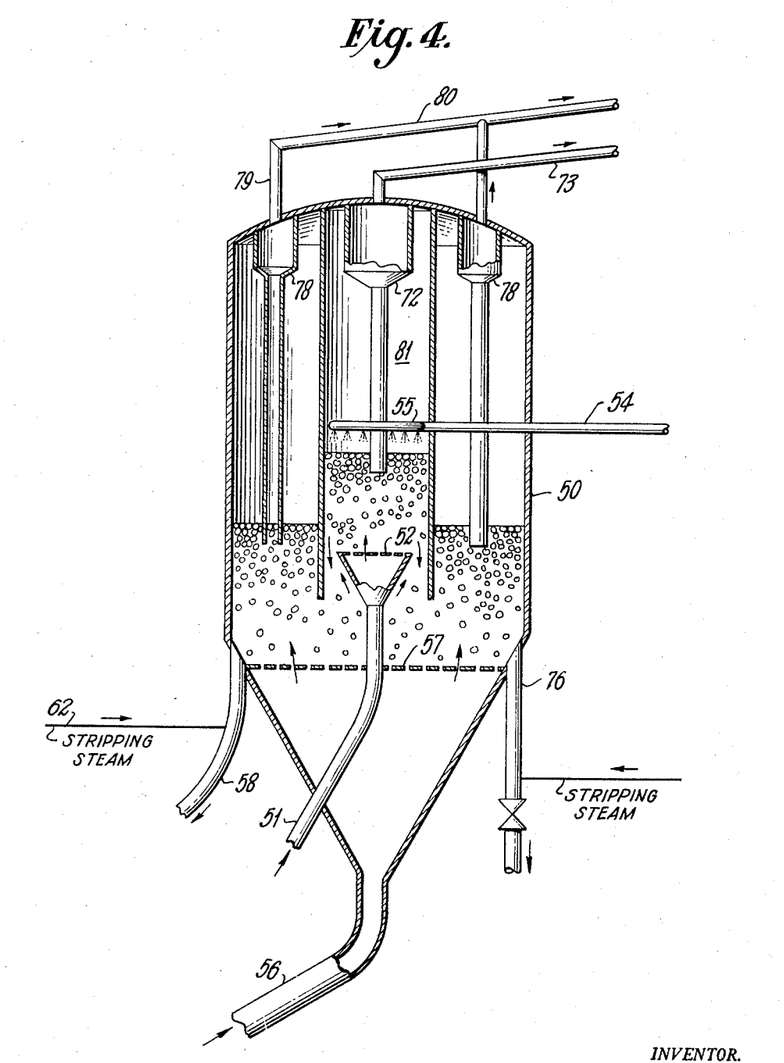
Figures 4, 5 and 6 are illustrations, partly in section, of modified forms of the coking vessel employed in connection with the apparatus of Figure 3.

Figure 4 is a modification of the coker vessel 50 of Figure 3. Like reference numerals have been used to denote like parts. In this modification cylindrical partition 58 extends from the top of vessel 50 forming a cylindrical central section 81 open at its lower end only. When employing this modification of coker vessel 50 the vapors formed in the central section 81 and in the annular section 82 can be recovered separately.

Figure 5:
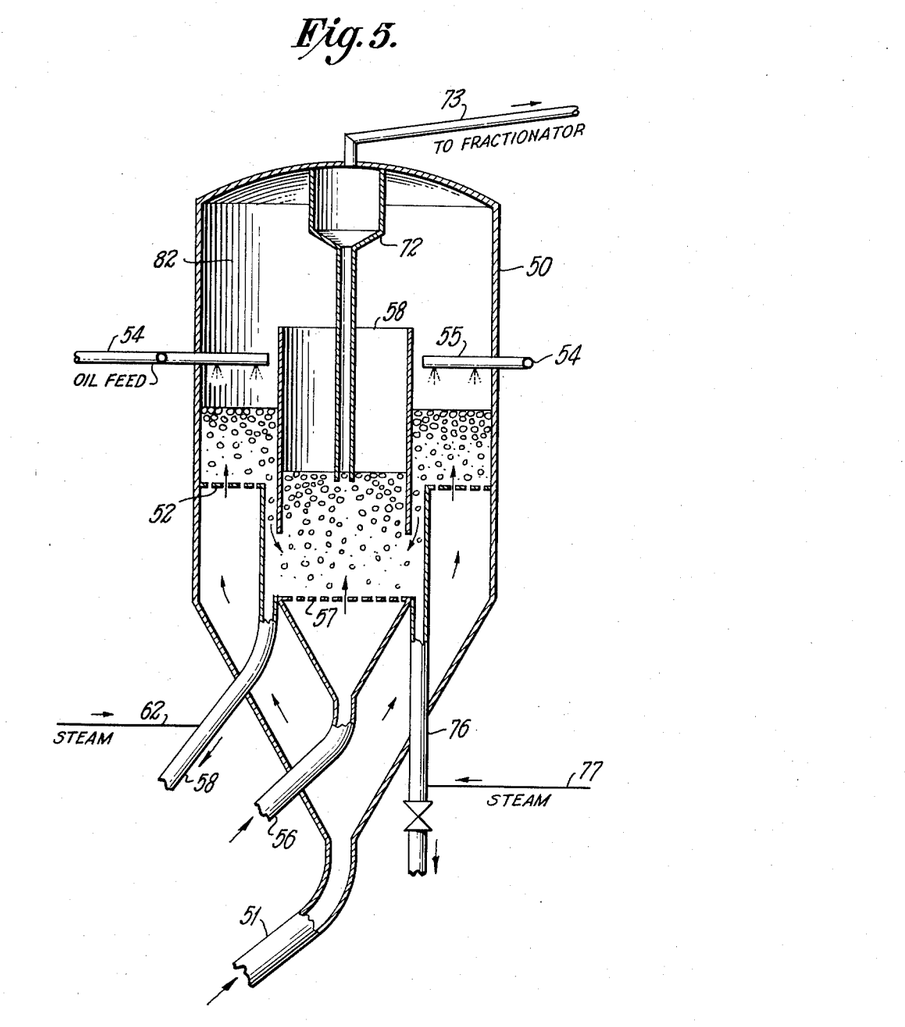

Figure 5 is another modification of the coker vessel 50 shown in Figure 3. Like reference numerals have been used to denote like parts. In this modification distributor grid 52 is annular in shape and is positioned in the lower portion of annular section 82. In the operation of this modification of coking vessel 50 the oil to be coked is introduced into annular section 82 as shown. The remainder of the operation is similar to that described for the coker vessel 50 of Figure 3. The partially coked particles in the annular portion of the fluidized bed settle past grid 52 where they are contacted and admixed with the clean additional finely divided solids from grid 57 and are transported into the central portion of the fluidized bed.

Figure 6:
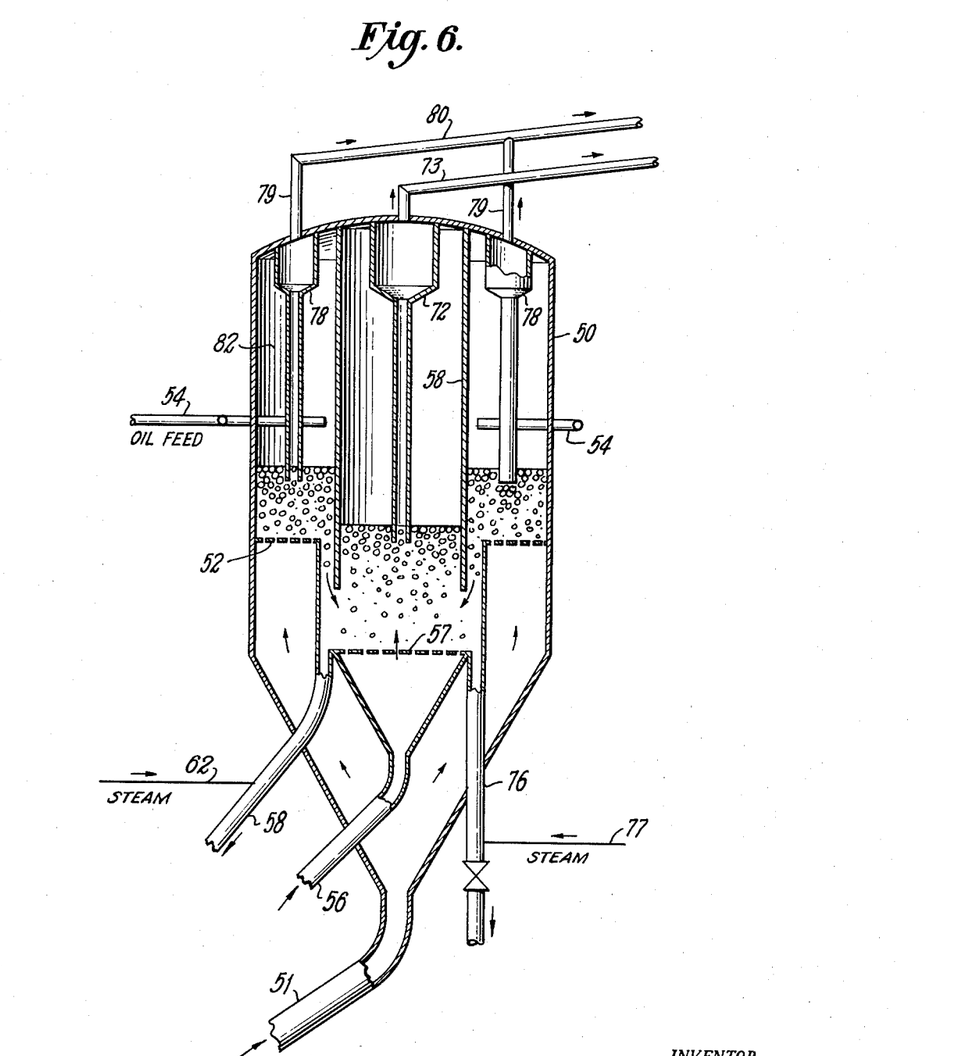

Figure 6 is a modification of the coker vessel 50 of Figure 5. Like reference numerals have been used to denote like parts. In this modification cylindrical partition 58 extends from the top of vessel 50 forming a cylindrical central section 81 open at its lower end only. When employing this modification of coker vessel 50 the vapors formed in the central section 81 and in the annular section 82 can be recovered separately.

A wide variety of oils can be processed according to the invention. Such oils include reduced crudes obtained from crude oil distillation, cracking still tars or residues, vacuum still tars or residues, etc. Such heavy oils are usually preheated prior to their introduction to the coking vessel. The temperature to which they are preheated depends upon the nature of the oil but will generally range from 300–1000° F., and preferably from 650–850° F. When an extremely heavy oil, tar or pitch is being coked, its viscosity can be still further reduced by dilution with a lighter hydrocarbon such as a gas oil or kerosene.

The particulate material employed can be any heat resistant material. It is preferably an inert material. Refractory pebbles having a diameter ranging from 1/32 to 3/4 inch, preferably about 3/8 inch diameter, are a presently preferred contact material for the embodiment of the invention wherein a downwardly moving bed is employed. Granular coke particles having a mesh size from 20 to 1½, preferably about 3–4 mesh is also a preferred contact material. Other particulate materials which can be employed are beach gravel, crushed fire brick, spent catalysts, etc. The particulate material can be porous or non-porous.

In the embodiment of the invention employing a fluidized bed of finely divided solids the particulate material can be any of those named above and having a particle size in the range of 10 to 500 microns, preferably 10 to 200 microns, and still more preferably 50 to 70 microns.

Operating conditions will vary according to the oil being coked. In the embodiment of the invention wherein a downwardly moving bed is employed the temperature of the first introduced particulate material, i.e., that introduced at the upper part of the coking vessel will depend upon the type of oil and the temperature to which it has been preheated. However, the temperature of this material will usually range from 650° to 950° F. The temperature of the particulate material introduced at lower points in the bed will range from 900 to 1500° F. The temperatures of the reheated particulate material leaving the reheater will range from 1000 to 1700° F., and will generally be about 1300° F. The temperatures of the streams of particulate material introduced into the coking vessel are regulated by the coolers shown to maintain the upper portion of the bed in the range of 800 to 900° F., and the lower portion of the bed in the range 850 to 1600° F. The weight ratio of oil feed to particulate material in the upper part of the bed will range from 1:5 to 1:20, preferably about 1:10, and in the lower part of the bed after dilution by introduction of additional particulate material will range from 1:13 to 1:50, preferably about 1:25.

In the embodiment of the invention wherein a fluidized bed of finely divided solids is employed the temperature of that portion of the fluidized bed into which the oil feed is introduced is usually maintained within the range of 650 to 950° F., preferably 750 to 850° F. The temperature of the other portion of the bed is usually maintained within the range of 850 to 1600° F., preferably 950 to 1300° F. These temperatures, while dependent to some extent on the temperature of the oil feed, are largely controlled by the temperatures of the incoming stream of fluidized solids. The temperature of the stream entering the fluidized bed through distributor grid 52 will usually range from 650 to 950° F., preferably 750 to 850° F., and that entering through distributor grid 57 will generally be substantially higher, within the range from 850 to 1600° F., preferably 950 to 1300° F. The temperature in reheater 61 is usually maintained within the range 1000 to 1700° F.

The apparent density of the fluidized bed will range from 10 to 50, preferably 20 to 50 pounds per cubic foot, and the velocity of the fluidizing medium flowing upwardly through the bed will have a superficial linear velocity between about 1 to 5, preferably 1 to 2 feet per second. The weight ratio of oil feed charged to solids charged to the coker will range from 1:5 to 1:10, preferably from 1:7. It is preferred to maintain the height of that portion of the bed into which the feed is introduced higher than that in the other portion of the bed. Due to the relative positions of the distributor grids 52 and 57 this can be done by adjusting the velocity of the fluidizing medium passing through each.

An additional feature and sub-combination of the invention is that the method and apparatus of the embodiment wherein a fluidized bed of finely divided solids is employed is not limited to carrying out a coking reaction but is adaptable to carrying out other reactions in the presence of or employing a fluidized bed of finely divided solids. For example, another reactant can be substituted for the oil to be coked, and/or still other reactants can be introduced with one or both of the introduced streams of finely divided solids. The finely divided solids can be inert or catalytic. These and other variations of this feature of the invention will be apparent to those skilled in the art reading this disclosure.

Example I below illustrates a moving bed coking process employing the invention and Example II illustrates a fluidized bed process employing the invention.

Example I

A 10° A.P.I. gravity vacuum reduced Western Kansas crude oil at a temperature of approximately 750° F. is sprayed into a freely-falling stream of hot inert refractory pebbles having a temperature of approximately 900° F. and a diameter of about ⅜ inch, and onto the top of a bed of said pebbles to form a thin layer of oil on the pebbles. The upper ⅓ portion of the bed is maintained at approximately 890° F., and the lower ⅔ portion of the bed after introduction of additional hot pebbles is maintained at approximately 1100° F. The weight ratio of oil feed to pebbles in the said upper portion of the bed is approximately 1:10 and in the said lower portion of the bed is approximately 1:25. Said oil layer is partially coked in the upper portion of said bed and coking is completed in the lower portion of the bed in the presence of steam. Freely-flowing pebbles covered with a layer of dry calcined coke are withdrawn from the bottom of the bed. Yields from this operation based on the oil charge are:

| | | |
|---|---|---|
| Gas | wt. percent | 8.5 |
| Naphtha | vol. percent | 15.4 |
| Gas oil | do | 24.0 |
| Heavy gas oil | do | 33.6 |
| Coke | wt. percent | 27.0 |

Example II

A 10° A.P.I. gravity vacuum reduced Western Kansas crude oil at a temperature of approximately 750° F. is sprayed onto the top of the central portion of a dense fluidized bed of finely divided coke maintained at a temperature of approximately 800° F., and having a particle size within the range of 10 to 200 microns, to form a thin layer of oil on said coke particles. Said layer of oil is partially coked and during said coking the heavier particles settle to the lower part of the bed where they are contacted and diluted by admixture with a second fluidized stream of finely divided coke introduced at a temperature of approximately 1300° F. The greater part of said admixture is transported into the annular portion of said bed maintained at a temperature of approximately 1100° F. where said coking is completed and free-flowing finely divided coke particles covered with a layer of dry calcined coke are withdrawn from the bottom of said annular portion of the bed. The average apparent density of the bed is approximately 30 pounds per cubic foot. Steam is used as the fluidizing medium. Yields from this operation based on the oil charge are:

| | | |
|---|---|---|
| Gas | wt. percent | 8.0 |
| Naphtha | vol. percent | 16.0 |
| Gas oil | do | 24.0 |
| Heavy gas oil | do | 33.0 |
| Net coke | wt. percent | 27.6 |

An additional advantageous feature of the invention is that the vapor collector tray 37 of Figure 2 can be employed to correlate the amount of vapors withdrawn directly from the bed through conduit 39 with the amount and/or the temperature of the hot particulate material introduced through conduits 18 and 19. Thus when desired the amount and temperature (heat content) of vapors rising from bed 14 can be controlled, by regulating the amount of vapors withdrawn through conduit 39 and the amount of heat introduced through conduits 18 and 19, to introduce hot vapors into the upper portion of coker 10 to contact cooler, less-cracked vapors. The cooler vapors will be heated and cracked to increase the yield of valuable unsaturated gases when such gases are desired.

In some instances with some oils the passage of hot vapors into the upper portion of the coking vessel 10 is advantageous in initiating the coking reaction. Generally speaking, initially contacting the oil with particulate material heated to excessively high temperatures tends to cause rapid initial cracking with the formation of a non-adhering finely divided coke which tends to entrain in the vapor stream or pack the bed. Thus it is preferred to first form a layer of the oil on relatively cool particulate material. Coking can then be initiated by contacting the said layer of oil with the said hot vapors. Spraying of the oil into the freely-falling stream of particulate material is another feature of the invention which contributes to the operation of this modification of the invention as will be understood by those skilled in the art. The oil introduced through line 16 can be utilized primarily to coat the particulate material with a layer of oil in which cracking is initiated and the oil introduced through line 17 can serve as a final quench oil for the vapors. While Figure 2 shows these oils coming from a common source, if desired they can come from different sources. For example, the oil introduced through line 17 can be a low-boiling quench oil which will be substantially completely vaporized. The freely-falling coated particulate material forms a moving barrier through which the greater part of the rising vapors must pass.

If desired the particulate material introduced into the lower portion of the bed (through conduits 18 and 19 in Figure 1), to supply additional heat and to prevent agglomeration, can be of a different size than that introduced into the upper portion of the coking zone. For example in some instances, as when agglomeration is more prevalent, smaller size particles are a more effective "diluent" in the lower portion of the bed. In such instances classifying means is incorporated into surge pot 31.

While the now preferred modus operandi of the invention is to operate that portion of the bed wherein the coking is completed at a higher temperature it should be understood that the invention is not so limited. By employing a longer residence time the coking can be completed at substantially the same temperature at which it is initiated. Thus "additional heat" can be introduced into the lower portion of the bed to compensate for heat absorption due to the endothermicity of the reaction without necessarily increasing the temperature of said lower portion of the bed.

Reasonable variation and modification are possible within the scope of the foregoing disclosure, the drawings and the appended claims to the invention the essence of which is that a method and apparatus have been provided for the coking of a hydrocarbon oil, said method comprising: forming a layer of the oil to be coked on the particles in one portion of a bed of particulate material in a coking zone maintained under coking conditions, at least partially coking said oil, during which coking the coated particles are caused to settle and enter another portion of said bed wherein dilution of said coated particles is caused by the introduction of additional hot clean particulate material, said coking is completed and free-flowing particles covered with a layer of dry calcined coke are withdrawn from said zone, a feature of one embodiment of said method being that the amount of vapors withdrawn directly from the bed can be correlated with the amount of heat introduced into the bed to regulate the amount and heat content of vapors entering the upper portion of said zone and thereby control the amount of cracking in the upper portion of said zone; said apparatus in one embodiment comprising a coking vessel wherein a downwardly moving bed of granular particulate material is maintained under coking conditions, and means for introducing additional hot clean particulate material into a lower portion of said bed; said apparatus comprising in another embodiment a coking vessel wherein a dense fluidized bed of particulate material is maintained under coking conditions, said vessel having a cylindrical partition mounted between the ends of said vessel and forming a cylindrical section surrounded by an annular section, said sections being merged at their lower part; a first distributing means positioned in the lower portion of one of said sections; a second distributing means positioned in the lower portion of said vessel and at a lower elevation than said first distributing means; means for introducing an oil to be coked into one of said sections; means for introducing finely divided solids into said vessel through each of said distributor means; and means for withdrawing reaction products from said vessel; and, in addition, the embodiment of the invention wherein a fluidized bed of finely divided solids is employed is not limited to carrying out a coking reaction but is adaptable for carrying out other reactions in the presence of or employing a fluidized bed of finely divided solids.

I claim:

1. A method of coking an oil which comprises: introducing a first stream of hot particulate material into a coking zone maintained under coking conditions to establish a bed of particulate material in said zone; introducing a stream of said oil from a point above and downwardly onto the top of said bed, a portion of said oil being vaporized and removed from an upper portion of said zone before substantial cracking occurs and causing an unvaporized portion of said oil to coat and adhere to said particulate material in the upper portion of said bed as a layer of reduced oil; at least partially coking said layer of reduced oil; during said coking, transferring said coated particulate material to a lower portion of said bed and during said coking and said transfer, diluting and preventing agglomeration of said coated particles while being coked and transferred by the introduction of a second stream of hot uncoated particulate material at a point below the point of introduction of said first stream of particulate material; completing the coking of any uncoked oil on said particulate material with the additional heat from said second stream of hot particulate material; withdrawing vapors resulting from said coking from the upper portion of said zone; and withdrawing particulate material covered with a layer of coke from the lower portion of said zone.

2. A method for the conversion of a hydrocarbon oil into lighter hydrocarbons and coke, which method comprises: introducing a first stream of hot inert pebbles as a freely-falling stream into the upper portion of a coking zone maintained under coking conditions to establish a bed of said pebbles in said zone; maintaining a downwardly moving bed of pebbles in said zone by withdrawing pebbles from the bottom of said zone; spraying said oil into said zone, from a point above the point of entry of said pebbles, in a manner and amount to form a layer of oil on the pebbles in said freely-falling stream and the top of said bed, a portion of said oil being vaporized and removed from an upper portion of said zone before substantial cracking occurs and causing an unvaporized portion of said oil to coat and adhere to said pebbles as a layer of reduced oil; at least partially coking said layer of reduced oil as said bed moves downwardly; during said coking and said downward movement, diluting and preventing agglomeration of said coated pebbles while being coked and moved downwardly by the introduction of an additional stream of hot uncoated pebbles into said bed at a point below the point of introduction of said first stream of pebbles; completing the coking of said layer of reduced oil to form a layer of coke on said pebbles; introducing stripping steam into a lowermost portion of said bed; withdrawing vapors resulting from said coking from the upper portion of said zone; calcining said coke; and withdrawing from the bottom of said zone a stream of free-flowing pebbles covered with a layer of dry calcined coke.

3. A method of coking an oil which comprises: introducing a first hot fluidized stream of finely divided contact solids into a coking zone maintained under coking conditions to establish a dense fluidized bed of said solids in said zone; spraying said oil from a point above and downwardly onto the top of said bed, a portion of said oil being vaporized and removed from an upper portion of said zone before substantial cracking occurs and causing an unvaporized portion of said oil to coat and adhere to said solids in the upper portion of said bed as a layer of reduced oil; at least partially coking said layer of reduced oil, during which coking, more heavily coated solids are caused to settle from said upper portion of said bed into the lower portion of said bed; during said coking and said settling, avoiding agglomeration of said coated solids while being coked and settled by diluting and forming an admixture of said settling solids with a second fluidized stream of hot finely divided uncoated contact solids introduced at a locus below the locus of introduction of said first fluidized stream of finely divided contact solids; completing the coking of any uncoked oil on said solids with the additional heat from said second stream of hot fluidized finely divided solids; withdrawing vapors resulting from said coking from the upper portion of said zone; and withdrawing fluidized finely divided solids covered with a layer of coke from the lower portion of said zone.

4. A method according to claim 1 wherein said bed of particulate material is a dense fluidized bed of finely divided solids.

5. A method according to claim 1 wherein said bed of particulate material is a downwardly moving bed of granular particles.

6. The method of claim 2 wherein granular coke particles are employed instead of said pebbles.

7. The method of claim 2 wherein said additional stream of hot pebbles is introduced into said bed at a substantially higher temperature than said first stream of pebbles.

8. The method of claim 3 wherein said finely divided contact solids are finely divided coke.

9. The method of claim 3 wherein said second stream of fluidized contact solids is introduced into said bed at a substantially higher temperature than said first stream of fluidized contact solids.

10. In a coking zone maintained under coking conditions and wherein a dense fluidized bed of hot finely divided contact solids is maintained, said bed having a central portion separated from a surrounding annular portio at an upper part of the bed and merged with said annular portion at a lower part of the bed, said bed being maintained by introducing a first fluidized stream of hot finely divided solids at an intermediate locus into one of said central and said annular portions of said bed and introducing a second fluidized stream of hot finely divided solids into the bottom of said bed at a locus below the locus of introduction of said first stream of finely divided solids, the method of coking an oil which comprises: spraying said oil from a point above and downwardly onto the top of that portion of said bed into which said first fluidized stream of finely divided solids is introduced, a portion of said oil being vaporized upon contact with said solids and causing an unvaporized portion to coat and adhere to said solids as a layer of reduced oil; at least partially coking said reduced oil, during which coking more heavily coated solids are caused to settle from said last mentioned portion of said bed into said lower part of said bed; during said coking and said settling, avoiding agglomeration of said coated solids while being coked and settled by diluting and forming an admixture of said settling solids with said second stream of hot finely divided solids introduced at a temperature and in an amount sufficient to prevent agglomeration of the said coated solids as said coking proceeds; transporting at least a portion of said admixture into that portion of said bed other than the said portion into which said first fluidized stream of finely divided solids is introduced; completing said coking; withdrawing vapors from said zone; and withdrawing free-flowing finely divided solids covered with a layer of coke from said zone.

11. A method for the conversion of a 10° API gravity vacuum reduced Western Kansas crude oil into lighter hydrocarbons and coke, which method comprises: introducing a first stream of hot inert pebbles as a freely-falling stream, at a temperature of about 900° F., into an upper portion of a coking zone maintained under coking conditions to establish a bed of said pebbles in said zone; maintaining a downwardly moving bed of pebbles in said zone by withdrawing pebbles from the bottom of said zone; spraying said oil, at a temperature within the range of 650–850° F., into said zone from a point above the point of entry of said pebbles, in a manner and amount to form a layer of oil on the pebbles in said freely-falling stream and the top of said bed, a portion of said oil being vaporized and removed from an upper portion of said zone before substantial cracking occurs and causing an unvaporized portion of said oil to coat and adhere to said pebbles as a layer of reduced oil, at least partially coking said layer of reduced oil as said bed moves downwardly; during said coking and said downward movement, diluting and preventing agglomeration of said coated pebbles while being coked and moved downwardly by the introduction of an additional stream of hot uncoated pebbles, at a temperature within the range of 1000–1300° F., into said bed at a point below the point of introduction of said first stream of pebbles; completing the coking of said layer of reduced oil to form a layer of coke on said pebbles; introducing stripping steam into a lowermost portion of said bed; withdrawing vapors resulting from said coking from the upper portion of said zone; calcining said coke; and withdrawing from the bottom of said zone a stream of free-flowing pebbles covered with a layer of dry calcined coke.

12. An apparatus for the coking of a hydrocarbon oil which comprises: a vertical substantially cylindrical vessel having a cylindrical partition mounted between the ends of and within said vessel and forming an open ended cylindrical section adapted to contain a first portion of a fluidized bed of finely divided solids surrounded by an annular section adapted to contain a second portion of a fluidized bed of finely divided solids within said vessel, said sections being merged at their lower part; a first finely divided solids distributing grid means positioned in the lower portion of one of said sections; a second finely divided solids distributing grid means positioned in the lower portion of said vessel; conduit means, separate from each of said grid means, for introducing said oil into the upper portion of one of said sections; means for introducing finely divided solids into said vessel through each of said distributing grid means; means for withdrawing substantially solids free vapors from said vessel; and means for withdrawing finely divided solids from said vessel.

13. In a coking zone maintained under coking conditions and wherein a dense fluidized bed of hot finely divided contact solids is maintained, said bed having an upper central portion separated from a surrounding annular portion at an upper part of the bed and merged with said annular portion at a lower part of the bed, said bed being maintained by introducing a first fluidized stream of hot finely divided solids at an intermediate locus into said central portion of said bed and introducing a second fluidized stream of hot finely divided contact solids into the bottom of said bed at a locus below the locus of introduction of said first stream of finely divided solids, the method of coking a hydrocarbon oil which comprises: spraying said oil from a point above and downwardly onto the top of the central portion of said bed in a manner and in an amount to form a layer of oil on the hot finely divided solids in said central portion of said bed; a portion of said oil being vaporized upon contact with said solids and causing an unvaporized portion to coat and adhere to said solids as a layer of reduced oil; at least partially coking said reduced oil, during which coking more heavily coated solids in said upper central portion of said bed are caused to settle into said lower part of said bed; during said coking and said settling, avoiding agglomeration of said coated solids while being coked and settled by diluting and forming an admixture of said settling solids with said second stream of hot finely divided solids introduced at a temperature and in an amount sufficient to prevent agglomeration of the said coated solids as said coking proceeds; transporting at least a portion of said admixture into said annular portion of said bed; completing said coking; contacting vapors countercurrently with said sprayed oil to quench said vapors; withdrawing quenched vapors from said zone; and withdrawing free-flowing finely divided solids coated with a layer of dry calcined coke from said zone.

14. The method of claim 13 wherein vapors formed in said central portion of said bed are recovered separately from vapors formed in said annular portion of said bed.

15. In a coking zone maintained under coking conditions and wherein a dense fluidized bed of hot finely divided contact solids is maintained, said bed having a lower central portion separated from a surrounding annular portion at an upper part of the bed and merged with said annular portion at a lower part of the bed, said bed being maintained by introducing a first stream of hot finely divided solids into said annular portion of said bed and introducing a second stream of hot finely divided solids into the bottom of said bed at a point below the point of introduction of said first stream of finely divided solids, the method of coking a hydrocarbon oil which comprises: spraying said oil from a point above and downwardly onto the top of said annular portion of said bed in a manner and in an amount to form a layer of oil on the hot finely divided solids in said annular portion of said bed; a portion of said oil being vaporized and causing an unvaporized portion to coat and adhere to said solids as a layer of reduced oil; at least partially coking said reduced oil, during which coking more heavily coated solids in said annular portion are caused to settle into said lower part of said bed; during said coking and said settling, avoiding agglomeration of said coated solids while being coked and settled by diluting and forming an admixture of said settling solids with said second stream of hot finely divided solids introduced at a temperature and in an amount to prevent agglomeration of the said coated solids as said coking proceeds; transporting at least a portion of said admixture into said central portion of said bed; completing said coking; contacting vapors countercurrently with said sprayed oil to quench said vapors; withdrawing quenched vapors from said zone; and withdrawing free flowing finely divided solids coated with a layer of dry calcined coke from said zone.

16. The method of claim 15 wherein vapors formed in said annular portion of said bed are recovered separately from vapors formed in said central portion of said bed.

17. An apparatus for the coking of a hydrocarbon oil which comprises: a vertical substantially cylindrical vessel having a cylindrical partition mounted intermediately between the ends of and within said vessel and forming a cylindrical central section open at both ends and adapted to contain a first portion of a fluidized bed of finely divided solids surrounded by an annular section adapted to contain a second portion of a fluidized bed of finely divided solids within said vessel, said sections being merged at their lower part; a first finely divided solids distributor grid means having a diameter less than and mounted within the lower portion of said central section; a second finely divided solids distributor grid means having a diameter greater than said central section and positioned in the lower portion of said vessel below said central section and below said first distributor means; conduit means, separate from each of said grid means, for introducing oil to be coked into the upper portion of said central section; means for introducing finely divided fluidized solids into said vessel through each of said distributor grid means; means for withdrawing substantially solids-free vapors from said vessel; and means for withdrawing finely divided solids from said vessel.

18. An apparatus according to claim 17 wherein said cylindrical partition extends from the top of said vessel and forms a cylindrical central section open at its lower end only.

19. An apparatus for the coking of a hydrocarbon oil which comprises: a vertical substantially cylindrical vessel having a cylindrical partition mounted intermediately between the ends of and within said vessel and forming a cylindrical central section open at both ends and adapted to contain a first portion of a fluidized bed of finely divided solids surrounded by an annular section adapted to contain a second portion of a fluidized bed of finely divided solids within said vessel, said sections being merged at a lower part of the bed; a first finely divided solids distributor grid means annular in shape and mounted in the lower part of said annular section; a second finely divided solids distributor grid means positioned in the lower portion of said vessel below said central section and below said first distributor means; conduit means, separate from each of said grid means, for introducing oil to be coked into the upper portion of said annular section; means for introducing finely divided fluidized solids into said vessel through each of said distributor grid means; means for withdrawing substantially solids-free vapors from said vessel; and means for withdrawing finely divided solids from said vessel.

20. An apparatus according to claim 19 wherein said cylindrical partition extends from the top of said vessel and forms a cylindrical central section open at its lower end only.

21. An apparatus according to claim 17 having a baffle substantially cylindrical in form throughout the greater portion of its length mounted within said cylindrical partition so as to form an annulus between said baffle and said partition, said baffle at its lower extremity extending beyond the lower end of said partition in a downwardly direction and being curved laterally in a direction toward the vertical wall of said vessel.

References Cited in the file of this patent

UNITED STATES PATENTS

| | | |
|---|---|---|
| 2,477,750 | Johnson | Aug. 2, 1949 |
| 2,490,336 | Crowley | Dec. 6, 1949 |
| 2,525,925 | Marshall | Oct. 17, 1950 |
| 2,582,711 | Nelson | Jan. 15, 1952 |
| 2,614,968 | Simms | Oct. 21, 1952 |
| 2,650,155 | Medlin | Aug. 25, 1953 |
| 2,690,990 | Adams et al. | Oct. 5, 1954 |
| 2,729,428 | Milmore | Jan. 3, 1956 |
| 2,742,518 | Mattox | Apr. 17, 1956 |

FOREIGN PATENTS

| | | |
|---|---|---|
| 511,838 | Belgium | June 30, 1952 |
| 1,062,025 | France | Dec. 2, 1953 |